United States Patent
Robl et al.

(10) Patent No.: US 8,996,290 B2
(45) Date of Patent: Mar. 31, 2015

(54) MODEL-BASED EFFICIENCY SCORING IN AUTOMOTIVE ENGINEERING

(71) Applicants: M2C Solutions GmbH, Offenberg (DE); ITK Engineering AG, Kuhardt (DE)

(72) Inventors: Christian Robl, Offenberg (DE); Michael Englert, Kuhardt (DE)

(73) Assignees: M2C Solutions GmbH, Offenberg (DE); ITK Engineering AG, Kuhardt (DE)

( * ) Notice: Subject to any disclaimer, the term of this patent is extended or adjusted under 35 U.S.C. 154(b) by 0 days.

(21) Appl. No.: 14/075,050

(22) Filed: Nov. 8, 2013

(65) Prior Publication Data

US 2014/0136092 A1    May 15, 2014

(30) Foreign Application Priority Data

Nov. 9, 2012   (DE) .................. 10 2012 021 919

(51) Int. Cl.
*G06F 19/00* (2011.01)
*G07C 5/00* (2006.01)
*G06Q 10/00* (2012.01)

(52) U.S. Cl.
CPC ............... *G07C 5/008* (2013.01); *G06Q 10/00* (2013.01)
USPC ...................................................... 701/123

(58) Field of Classification Search
USPC .............. 701/1, 123, 400, 411, 418, 34.2
See application file for complete search history.

(56) References Cited

U.S. PATENT DOCUMENTS

| | | |
|---|---|---|
| 2012/0172017 A1 | 7/2012 | Ratti et al. |
| 2013/0158849 A1* | 6/2013 | Maura ........................... 701/123 |
| 2013/0261966 A1* | 10/2013 | Wang et al. ................... 701/533 |

FOREIGN PATENT DOCUMENTS

| | | |
|---|---|---|
| EP | 2560146 | 2/2013 |
| WO | 2010018019 | 2/2010 |

OTHER PUBLICATIONS

"Automatic Report Generation in Model-based Design", S. Mahapatra, MathWorks, Oct. 2010.
(Predictive Powertrain Control im Mercedes Actros [Predictive powertrain control in Mercedes Actros]—http://www.heise.de/autos/artikel/Die-Predictive-Powertrain-Control-im-Mercedes-Actros-1581210.html), Jul. 2012.
Li, Kun, et al. Personalized driving behavior monitoring and analysis for emerging hybrid vehicles. In: Pervasive Computing, 10th International Conference. SpringerSerlin Heidelberg, Jun. 18-22, 2012.
(Continued)

*Primary Examiner* — Kim T Nguyen
(74) *Attorney, Agent, or Firm* — Lucas & Mercanti, LLP; Klaus P. Stoffel

(57) ABSTRACT

A scoring device for evaluating the efficiency of a route travelled with a vehicle, an efficiency evaluation method and a system. Acceleration sensors are formed in a mobile telecommunications device in order to obtain position and acceleration data which are supplied to the scoring device via an interface in order to calculate a vehicle model with set parameters from the sensor data. The vehicle model serves to calculate efficiency values for the route travelled which are compared for similarity to reference efficiency values and are incorporated in a graphical depiction of the route travelled.

14 Claims, 3 Drawing Sheets

(56) References Cited

OTHER PUBLICATIONS

Mathworks, User Stories, http://www.mathworks.de/automotive/userstories.html?file=50327&title=Scania%20Develops%20Fuel-Saving%20Driver%20Support%20System%20for%20Award-Winning%20Long-Haulage%20Trucks), 2012.

Tulusan, Johannes; Staake, Thorsten; Fleisch, Elgar. Direct or indirect sensor enabled eco-driving feedback: Which preference do corporate car drivers have? In: Internet of Things (IOT), 2012 3rd International Conference on the. IEEE, Oct. 2012.

* cited by examiner

MODEL-BASED EFFICIENCY SCORING IN AUTOMOTIVE ENGINEERING

CROSS-REFERENCE TO RELATED APPLICATIONS

The present application claims priority of DE 10 2012 021 919.9, filed Nov. 9, 2012, the priority of this application is hereby claimed and this application is incorporated herein by reference.

BACKGROUND OF THE INVENTION

1. Field of the Invention

The present invention relates to the fields of automotive engineering and telematics, and concerns in particular an online efficiency evaluation (in particular in relation to fuel consumption, vehicle wear, etc.) for a journey over a route with a vehicle.

2. Prior Art

The use of vehicle models in automotive engineering is known, in particular for the purpose of developing functions and performing vehicle testing. Vehicle models are used in test stands (component or module test stands in the automotive field) or in "hardware-in-the-loop" simulations to simulate vehicle components or open-loop control means which do not actually exist in the test stand. Model-based hardware-in-the-loop simulations are also used to develop and test open-loop control means (such as engine open-loop control means). In this case, the input interface of a control means to be tested may be fed with sensor data from the model. In a closed-loop control, the corresponding reaction of the open-loop control means is fed via the outputs thereof back to the model as feedback data. In vehicle testing, virtual driving manoeuvres, inter alia, may be carried out, in which driving reactions are preset as model input variables. Vehicle-specific internal datasets (such as torque, longitudinal or lateral acceleration) are calculated by the vehicle model and input variables for the test item(s) are generated therefrom. External factors, such as information on the course of the road and friction (dry, wet or icy road surface) may also be entered into the vehicle model as further input variables. With regard to the use of vehicle models in the automotive industry, reference is made for example to the paper "Automatic Report Generation in Model-based Design", S. Mahapatra, MathWorks, 2010, SAE International.

From the fields of telematics and toll applications, it is known to establish the position of a vehicle in order to be able to carry out further calculations based thereon. The position data may be obtained for example by a GPS sensor.

From the field of "autonomous driving", it is further known to predictively determine the gear selection of lorries from the sensor data obtained, for the purposes of fuel economy (Predictive Powertrain Control im Mercedes Actros [Predictive powertrain control in Mercedes Actros]. Furthermore, a scoring method is known from Scania.

It is desirable, in particular in respect of fuel economy, to be able to provide information on the efficiency of the driving style during the journey itself. It is a drawback of known automotive electronic systems that it is necessary to provide additional electronic modules on the on-board computer. Since this represents increased expense (costs, time and installation) for drivers, these add-on systems are not widely used in practice. Providing efficiency calculations as additional graphical information incorporated into a graphical depiction of the route has not been possible to date.

SUMMARY OF THE INVENTION

Based on the above prior art, the object of the present invention is therefore to provide an approach with which data for evaluating the efficiency of the journey may be output in the vehicle directly during the journey itself. In particular, a scoring system is to be provided, with which the economy of the driving style and/or of the selected driving route may be established. Furthermore, the efficiency evaluation is also to include a comparison with a reference journey over the route in question, in which an ideal driving style (for example from an expert driver) is saved and compared with the current driving style for similarity. Furthermore, it is to be possible to achieve a graphical depiction of the efficiency evaluation in the vehicle directly by incorporating it into a digital map of the route portion travelled.

Furthermore, it is to be possible to carry out the efficiency evaluation completely independently of the electronic system of the vehicle and any interfaces to the on-board computer (in particular, without interfaces to a vehicle diagnosis system (on-board diagnosis—OBD).

This object is achieved by a scoring device, an efficiency evaluation method and a scoring system according to the appended claims.

The invention is described below with reference to the method. Embodiments, alternative solutions, further features and advantages mentioned in this respect are also to be applied to the other solutions of the problem set out above (i.e. to the system and/or scoring device), and vice versa. The features claimed and/or described in connection with the scoring device may therefore also be applied to the method or the system, and vice versa. In this case, the respective functional features of the method are implemented by appropriate microprocessor modules or hardware modules which are formed so as to perform the respective functions. In this manner, the functional method step of obtaining sensor data corresponds for example, in terms of hardware implementation, to an (electronic) sensor.

According to one aspect, the present invention relates to a method for evaluating the efficiency of a journey or a driving style for a route travelled with a vehicle. The method comprises the following method steps:

obtaining acceleration and/or position data via a mobile telecommunications means carried in the vehicle and/or via a telematics unit located in the vehicle feeding the acceleration and/or position data obtained into a vehicle model calculated and provided for calculating the efficiency evaluation of the route in question travelled outputting the calculated efficiency evaluation, comprising a comparative depiction of actual efficiency values and reference efficiency values.

All method steps are preferably carried out automatically and may be implemented as microprocessor commands on a microcontroller. The microcontroller may be connected to further open-loop control means (electronic control units—ECUs) by a bus connection (such as a CAN bus).

The concepts used in connection with this application are described in greater detail below.

The term "efficiency evaluation" relates to the calculation and output of datasets used in connection with the evaluation of a driving style. This comprises in particular information on efficiency and comprises datasets on fuel consumption and vehicle wear. Vehicle data may relate in particular to individual vehicle components (brakes, clutch, tire abrasion, etc.). The purpose of the efficiency evaluation is to give the driver immediate, direct feedback on his driving style. It is crucial that the efficiency evaluation relate to the journey being travelled by the vehicle. In contrast to the data displayed before now to the driver on the dashboard or the on-board computer (such as speed, fuel consumption, revolutions per minute, etc.), the efficiency evaluation according to the invention always relates to the specific journey being travelled. A comparison is preferably carried out with reference values which are saved in the system and are intended to represent an optimum economy driving style for the journey in question (for example from an expert driver or from statistical calculations). In this manner, the driver is shown his degree of similarity with the reference values (i.e. the ideal values). Furthermore, the display according to the invention of the efficiency evaluation differs from the known depiction of vehicle data on the dashboard in that the efficiency evaluation according to the invention comprises change by time and/or route travelled. The route travelled is preferably depicted graphically and the respective efficiency values are transferred onto the route. The efficiency evaluation may be represented by visual markers on the route (for example particular coloured markings or other markers, as well as annotations in the graphical depiction). The efficiency evaluation thus comprises a depiction of the efficiency of the journey in question on the basis of the route travelled. It is preferably depicted directly on a map extract depicting the route travelled. In this manner, it is possible to mark the points at which the driving was particularly economical or uneconomical. It is thus also possible to accumulate and display improvements or deteriorations in driving behaviour over the various journeys.

The "reference efficiency values" may be configured in a preparation phase. Depending on the embodiment, different reference efficiency values may be taken into account in this process. In a preferred embodiment, the reference efficiency values at least comprise values in relation to fuel consumption and vehicle component wear. In this respect, further reference efficiency values may also be taken into account (for example in relation to acceleration, speed, driving in the wrong gear, incorrect tyre pressure, etc. Other embodiments do not only take into account efficiency values in terms of consumption and vehicle wear, but also take into account efficiency values in terms of operating costs, for example by selecting a toll-free route which may be somewhat longer but is more cost-effective overall, or by selecting ferries which represent a short distance but somewhat higher resulting costs.) The reference efficiency values may be calculated by means of a statistical method. In this method, all journeys obtained are obtained by a signal receiver and collected on a central server (preferably in an anonymous manner). The most efficient journey in each case is then selected from this set of obtained journeys in order to use the values thereof as reference efficiency values. Alternatively, the reference efficiency values may also be established by an expert driver. It is also possible to use previous earlier journeys by the same vehicle driver as a reference for the scoring procedure.

The "actual efficiency values" relate to a vehicle journey over a particular route. The actual efficiency values may apply to the route currently travelled or a route driven in the past for which an efficiency evaluation is to be carried out.

The vehicle model is a digital model which makes it possible to portray complex vehicle-related processes. Current research on embedded systems in the automotive field highlights the relevance of model-based methods (cf. for example "A Model-based Approach for Automotive Software Development", P. Braun, M. Rappl, Institut für Informatik, TU Munich). A plurality of open-loop control means, which are connected by a bus system so as to exchange data and which monitor or control vehicle-specific signals and/or measurement data in an open- or closed loop manner using actuators and sensors in an open- or closed loop control circuit, are generally used for this purpose. The basic techniques for generating models in the automotive field are known from the prior art. Reference is made in this respect to the book "Modellbildung and Simulation der Dynamik von Kraftfahrzeugen", Schramm Dieter, Hiller Manfred, Bardini Roberto, first edition, 2010, XII, pp. 465ff inter alia.

Depending on the embodiment of the invention, the vehicle model may be calculated either in the mobile telecommunications means (or the telematics unit, i.e. a portable unit carried in the vehicle) and/or on a stationary server (for example in a back office), or it may be calculated in a distributed manner, i.e. in part in the means in the vehicle and in part on the server. A specific vehicle model is generally calculated from a generic vehicle model. The specific model is characterised in that it is adapted to, and the parameters of said vehicle model are set for, the particular circumstances (dependent on vehicle data, vehicle type, journey data, such as the portion of the route, including gradients, curve radii, etc.). The specific vehicle model is calculated cyclically and dynamically in such a way that online updates may be calculated and provided automatically on the basis of the respective current position, acceleration and/or speed of the vehicle. The efficiency calculation may then be carried out based on the specific vehicle model calculated.

In the preferred embodiment, the vehicle model parameters are set to enable the efficiency calculation to be adapted to the specific motor vehicle in question. This means that the vehicle type and potentially further vehicle data are provided to the model in advance of the efficiency calculation. This may be achieved on the one hand through the method or scoring device querying the data via an interface to external entities (for example the on-board computer via an OBD interface) or, on the other hand, through the user entering the vehicle type manually.

The vehicle is preferably a vehicle of any type, including motorcycles, cars, lorries and commercial vehicles (such as buses, etc.) and special-purpose vehicles (such as amphibious vehicles, cranes, forklift trucks, tracked vehicles or automotive operating or construction machinery) and further driven vehicles (such as quad bikes, etc.). The vehicle is not limited to a particular drive type and may comprise different types of combustion engine or an electric drive (or hybrid drive). Furthermore, it is stipulated that the invention is not restricted to a particular operating principle (two-cycle, four-cycle, etc.) and also comprises different engine types (spark-ignition engine, compression-ignition engine, multifuel engine, etc.).

In a preferred embodiment, it is provided that the efficiency evaluation for a particular vehicle takes into account the vehicle type in question in such a way that the reference efficiency values also relate to the same vehicle type in order to establish the highest possible similarity range between actual values and reference efficiency values. If, however, no reference efficiency values are available for the same vehicle type, a category of reference efficiency values relating to the vehicle type with the greatest possible similarity to the vehicle type to be evaluated is chosen with the assistance of a selection algorithm.

The method is based on obtaining acceleration and position data. The acceleration data preferably comprise acceleration in all directions, i.e. in the x, y and z directions. For this purpose, both position sensors and acceleration sensors are preferably provided, from which data is then read out and processed further in a cyclical manner. Alternatively, the position data may also be obtained through further processing steps (double integration), inter alia, from the acceleration sensor data. For this purpose, it is initially necessary to obtain at least one reference position and an initial speed and then to perform updates in a cyclical manner over the course of the journey in order to ensure that the position determined in this manner does not differ from the actual position. For the sake of simplicity, only the term "acceleration data" is used below. According to one aspect of the invention, the term "acceleration data" is therefore to be understood to mean that it comprises position data. In this embodiment, both position data and acceleration data are obtained via appropriate position and acceleration sensors and are supplied to the vehicle model. This has the advantage that it is possible to update the location of the vehicle in a dynamic manner (graphical depiction of the calculated position) on a digital map (also depicted on the output unit). In an alternative embodiment, it is possible to dispense with obtaining position data and to derive or calculate them from the acceleration data obtained.

In a preferred embodiment, the acceleration data are not obtained by the vehicle or modules of the on-board computer (such as the speedometer) but by a separate means carried in the vehicle. This is preferably a mobile telecommunications means belonging to a vehicle passenger for example. The term "mobile telecommunications means" is not to be deemed to have a limiting effect in respect of a mobile telecommunications means, and is intended to describe any portable electronic means which may be carried in the vehicle as a separate module, such as smartphones, portable navigation means or navigation means which are integrated in a fixed manner, tablet PCs, portable computers (such as iPads, notebooks, laptops, etc.) or other electronic means.

It is also possible to obtain the acceleration data in a telematics unit. The telematics unit is also a separate electronic means formed with appropriate sensors (position sensors, acceleration sensors, gyro sensors, etc.). The telematics unit may also be integrated into a navigation means or connected thereto. The telematics unit further comprises input and output interfaces for exchanging data. The interfaces are preferably wireless. However, it is alternatively also possible to connect the telematics unit by cable to further electronic means (such as the on-board computer). It is also possible to integrate the telematics unit as an embedded system in a more comprehensive on-board means.

In an alternative embodiment, it is also possible to provide the method, in the form of a computer-implemented method, as an "app" on a server for download. The application may then be loaded onto the telematics unit or the mobile telecommunications means using an appropriate (in particular http-based or mobile-telecommunications-based) protocol.

As previously mentioned, the efficiency evaluation calculated is output on a monitor. The monitor may be the surface of a mobile telecommunication means or smartphone. Furthermore, the surface may be integrated into the telematics unit (for example into the navigation means). The efficiency evaluation calculated may also be output onto the surface of an on-board computer or an external computer connected via a network. It is preferably output in a graphical format and comprises a graphical depiction of the route travelled with route-specific efficiency values. This has the significant advantage that it is possible for the user to obtain a score directly and simply for his driving style in relation to the route portions travelled.

In a preferred embodiment, it is provided that the efficiency evaluation calculated is not only depicted on a monitor but also stored. It is preferably stored on a server in a central back office. The back office may be called by different clients via an authorised interface. This has the significant advantage that it is not only possible to depict the efficiency calculation online on the mobile telecommunications means or telematics unit while the vehicle is in operation, but it may also be retrieved for subsequent analysis on another computer (such as a PC). For this purpose, it is provided that the user must register using authorisation and authentication measures to obtain access to his efficiency score for his driving style. A user may preferably only obtain access to his own data. The data of other drivers are made anonymous and may merely serve as a reference. Depicting the efficiency evaluation on a surface of the mobile telecommunications means or telematics unit has the significant advantage that the driver obtains an efficiency score for his driving style directly while still travelling along the route itself and may take measures to improve it.

A crucial aspect of the invention is that the efficiency calculation also takes into account the particular route or route portion travelled. In this case, upward and downward gradients (or the elevation profile of the route travelled), curve radii, the width of the passable road, the road surface and/or air pressure conditions on the vehicle (obtained by air pressure sensors or derived from the acceleration data) are taken into account in particular. These route data may be derived from the position data. In more complex embodiments, further road portion data may be taken into account in this respect, such as (temporary—in particular where roadworks are being carried out—or permanent) speed limits, average travel speed by road type (if there are no limits indicated by road signs) or also average travel speeds to be expected on the basis of statistical data. In addition, in a preferred embodiment of the invention, traffic data are taken into account (data received regarding traffic conditions, such as traffic information broadcasts). In particular, the traffic situation or developments at the time the data is obtained is taken into account (for example heavy traffic, traffic jam, accident, light traffic, etc.). These data are taken into account in the efficiency score. The data required for the efficiency evaluation may be obtained by means of a route identification algorithm or other toll-based algorithms. Alternatively or in addition thereto, map-matching-based methods may also be applied. This has the advantage that the user obtains the efficiency evaluation incorporated directly into a map depicting the route travelled, in such a way that he can view the data in question with ease, even while driving. The invention thus advantageously enables the efficiency calculation and the route portion in question to be assigned to one another automatically.

According to an aspect of the invention, the efficiency evaluation comprises an indication of the change in the efficiency evaluation by location and/or time. This means that the user obtains information on how economically or efficiently he drove over a particular portion of the route travelled and/or in a particular time period during the journey time. This allows the efficiency evaluation to be broken down on the basis of the location and/or time parameters. This has the advantage of enabling a more detailed analysis of the efficiency evaluation. The efficiency evaluation is not, however, limited to a time period in the past, but may also apply to a time period in the future in order to provide the driver with predictive instructions, for example when adjusting speed in the event of an expected traffic jam, when determining the statistical travel speed on a particular portion at a particular time, etc.

According to an advantageous development of the invention, it is possible for the route portions travelled and the associated efficiency evaluations to be accumulated. In this manner, the user may for example obtain information on all routes travelled on a day or within a pre-configurable time window. It is further possible to analyse improvements/deteriorations in driving style (driving behaviour) over time. It is also possible to calculate and depict differences between the efficiency calculated for the driving style of reference drivers and/or reference vehicles and/or reference routes.

In a preferred embodiment, the efficiency evaluation method may be carried out in an entirely self-sufficient manner by the motor vehicle or the on-board computer. The position and/or acceleration data may be obtained by a mobile telecommunications means, which is carried in the vehicle, or by sensors and supplied to the scoring device. In this embodiment, it is not necessary for the scoring device to have an interface to the on-board computer of the vehicle. This has the significant advantage, inter alia, that the scoring device may be retrofitted at any time as a separate module and it is not necessary to integrate it into a vehicle component or another means (for example a mobile telecommunications means).

In an alternative embodiment, the scoring device may, however, optionally also comprise interfaces to the motor vehicle computer, for example in this case data may be read in via an OBD interface (on-board diagnosis system) (for example data relating to the vehicle type or further data for setting the vehicle model parameters). It is, however, expressly stipulated that said (OBD) interfaces are not vital, and are also not provided in advantageous embodiments of the invention, to allow the method to be carried out as self-sufficiently and independently as possible.

According to a further aspect, the present invention relates to a telematics unit comprising a scoring device and to a scoring device for evaluating the efficiency of a driving style for a route travelled with a vehicle. The scoring device comprises an interface for reading in position and/or acceleration data and a processor. The scoring device may optionally also comprise an output unit; the output unit may, however, also be connected externally to the scoring device via an interface (for example as a monitor of a further electronic means (navigation means or mobile telecommunications means)).

The position and/or acceleration data may be obtained by a mobile telecommunications means or another electronic means with appropriate position and/or acceleration sensors. In addition, the position and acceleration data may also be obtained by an (on-board) telematics unit. According to the invention, the position or acceleration data are not obtained by sensors arranged in the motor vehicle. This has the advantage that it is possible to check the motor vehicle sensor system with regard to position and/or acceleration measurements. The invention is thus based on separate additional acceleration sensors which are preferably included in an additional means (mobile telecommunications means, smartphone, tablet, computer-based means or on-board telematics unit).

The processor serves to read in the acceleration data obtained (along with the respective position and time data) and to feed said data into the vehicle model provided for the cyclic or dynamic calculation of the efficiency evaluation in respect of the route travelled. Furthermore, the processor serves to output the calculated efficiency evaluation onto an output unit (preferably a monitor of the mobile telecommunications means, the telematics unit or the on-board computer). The efficiency evaluation comprises a comparative depiction of actual efficiency values and reference efficiency values in a graphical depiction of the route travelled.

The interface for reading in the acceleration data is preferably wireless. Alternatively, however, a wired cable connection may also be provided in this case (for example if the telematics unit is a navigation means connected by cable).

In a preferred embodiment, the scoring device is integrated into the mobile telecommunications means and/or telematics unit as an embedded system. Alternatively, the scoring device may also be provided as a separate module. In this case, the separate module is formed with appropriate interfaces to the mobile telecommunications means and/or telematics unit. In a preferred embodiment, the separate module does not comprise any interfaces to the on-board computer and may thus be operated completely self-sufficiently and, in particular, independently of the vehicle (vehicle computer).

As mentioned above, the scoring device preferably comprises an interface for reading in the acceleration data. The acceleration data are conventionally obtained by appropriate sensors in the mobile telecommunications means and the efficiency evaluation is also conventionally output on the surface of the mobile telecommunications means. However, the means for obtaining the acceleration data and the output unit for outputting the efficiency evaluation calculated need not necessarily correspond to one another. For example, in alternative embodiments it is provided that the acceleration data be established by appropriate sensors which are arranged in a first means and that the efficiency evaluation calculated is output on a monitor of a second means. The first means and the second means need not necessarily correspond to one another. For example, the first means may be a smartphone belonging to a vehicle passenger and the second means may be a navigation means located in or integrated into the vehicle.

To enable the data recorded to be subsequently analysed and processed further, the efficiency values calculated are transmitted to the back office. In the back office, said values may also be archived so that they may be used as reference data for future calculations. It is also possible to accumulate the efficiency values calculated over a plurality of time periods and over a plurality of travelled routes. The actual efficiency values are output or displayed in relation to reference efficiency values. This makes it possible for the driver to obtain data on the extent to which he has achieved ideal or maximum efficiency. Traffic disruption is preferably taken into account in the reference values. In this case, the user may be provided with two output options:
1. A comparison between the actual efficiency values and the reference efficiency values irrespective of the traffic conditions and
2. A corrected depiction in which the traffic conditions are taken into account (ideal reference values cannot be obtained in stop/start mode).

In an advantageous development, the user may be provided with further metadata relating in particular to specific route portions and associated information for identifying the road (in this case for example notes which relate to a specific route portion and/or the respective traffic conditions and/or the time the data was obtained may be incorporated, for example in the form: "Warning: Steep gradient" or "Warning: Heavy rush-hour traffic on route portion travelled").

According to a further aspect, the present invention relates to an efficiency calculation system for a route travelled with a vehicle. The system comprises acceleration and position sensors, the scoring device (or merely the processor of the scoring device) and a back office with an output unit for depicting the efficiency evaluation. The system may also take the form of a mobile telematics unit.

The acceleration sensors may preferably be integrated into a mobile telecommunications means which is carried in the vehicle. The acceleration sensors may also be part of the telematics unit which is also located in the vehicle. The output unit comprises a monitor for graphically depicting a comparison of actual efficiency values and reference efficiency values in respect of the route portion travelled. The monitor is preferably a monitor of a mobile telecommunications means or telematics unit.

The back office preferably comprises a central server on which a computer program for calculating efficiency is saved and/or on which a vehicle model is saved. The back office preferably comprises a further storage means in which method-related data (previous efficiency evaluations, reference efficiency values, etc.) are stored. The server of the back office system may preferably be accessed via a wireless interface. It may be requested by various clients in the form of a web browser.

The scoring device may also be integrated into an electronic means as an embedded system in the form of a circuit board. It is further possible to provide the scoring device as a microprocessor solution. For example, it may be formed on a chip (FGPA—field-programmable gate array).

The method is generally computer-implemented. In this case, particular method portions may be part of a microprocessor solution and thus be hard-wired whereas other portions of the method may take the form of software. In this case, only individual portions or parts of the method would be software-implemented. In general, all portions or selected portions of the method are coded in binary form or are available in digital form. In this manner, all portions or individual portions of the method may be provided as source code, pre-compiled code (machine code) or as interpreted code or said portions may be interpreted by means of an interpreter. The crucial factor is that the software is directly incorporated into the technical means (in this case, a motor vehicle) as part of a technical system and it is used for open-loop control of vehicle components within said system. The parts of the method according to the invention which are implemented as software may be part of an embedded system which is embedded in and interacts with the surrounding motor vehicle or navigational system.

The method serves to store, process and relay processed data (in the form of sensor data obtained) and may be used to modify the open-loop control of actuators or other electronic means or modules (including within the framework of automatic or semi-automatic vehicle control) and to control other computer-based technical means (other entities connected via a network) in an open- or closed-loop manner. All method steps are preferably carried out automatically without user interaction.

The embodiments according to the invention of the method described above may also take the form of a computer program product comprising a computer program, the computer being prompted to carry out the method according to the invention described above when the computer program is executed on the computer or a processor in the computer.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

The invention is described in greater detail below with reference to the drawings.

Figure 1:
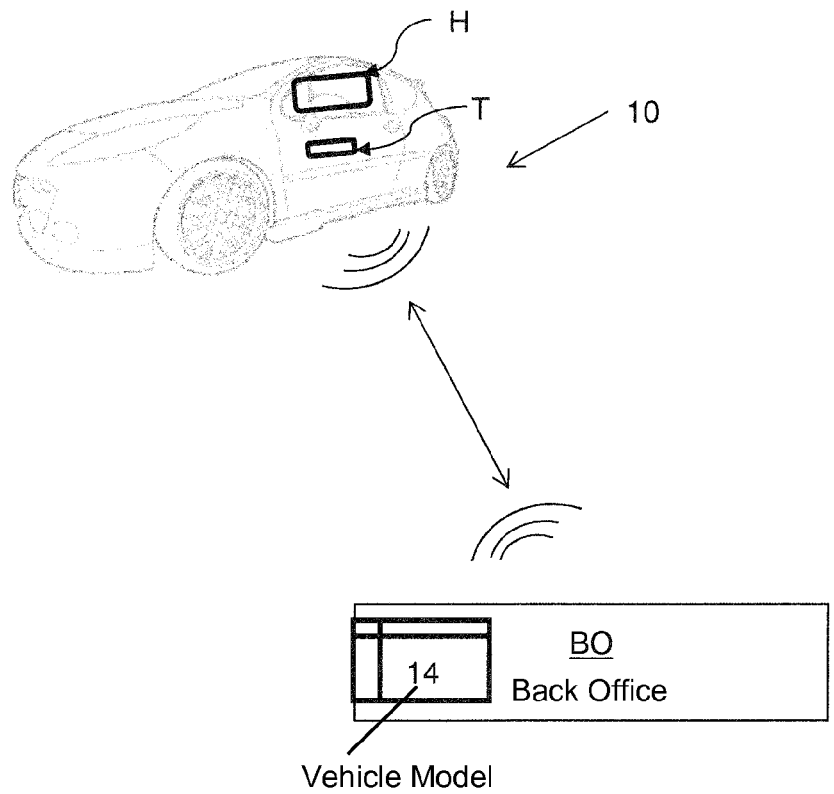
FIG. 1 is an overview of a vehicle comprising a telematics unit according to a preferred embodiment of the invention.

FIG. 1 shows a motor vehicle 10 driving along a route or a route portion. A mobile telecommunications means H and/or a telematics unit T are carried in the motor vehicle 10.

The mobile telecommunications means H and the telematics unit T are preferably separate electronic means with wireless interfaces belonging to a vehicle passenger. The mobile telecommunications means H and the telematics unit T comprise acceleration sensors and position sensors which shall both be referred to below by the term "acceleration sensors 12". The acceleration sensors 12 serve to obtain acceleration data and position data for the vehicle 10 and are shown in FIG. 2.

Figure 2:
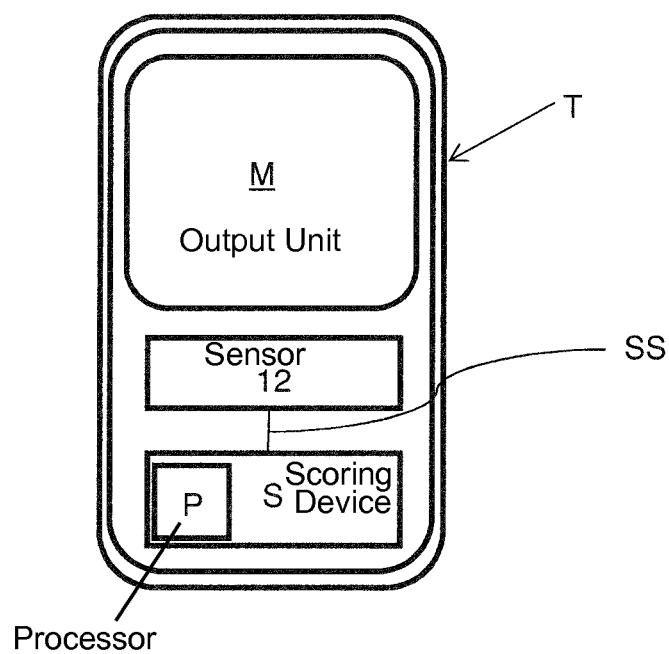
FIG. 2 is a schematic overview of a telematics unit according to a preferred embodiment.

As shown schematically in FIG. 2, the telematics unit T comprises a scoring device S and, in addition to the interface to the acceleration sensor 12, a processor P and an output unit, in particular a monitor M. In this embodiment, the processor P is integrated into the scoring device S. Alternatively, the processor P may also be implemented in another means (for example swapped out).

The scoring device S or telematics unit T are connected, so as to exchange data, to a back office BO which may take the form of a central server. According to an embodiment of the invention, a vehicle model 14 is saved in the back office BO. The parameters of the vehicle model 14 are preferably set in a configuration phase of the efficiency evaluation according to the invention. The parameter-setting procedure comprises at least the input of a vehicle type.

The processor P serves to read in the position and acceleration data obtained by the acceleration sensors 12 (a single acceleration sensor or a plurality of acceleration sensors may be provided; the latter case enabling more accurate measurement values to be obtained and measurement values to be checked). The processor P further serves to calculate the vehicle model 14 from the position and acceleration data read in, in order to calculate an efficiency evaluation for the route travelled. The efficiency evaluation comprises a comparative depiction of actual efficiency values (which relate to the specific route actually travelled by the vehicle keeper) and reference efficiency values which relate to a saved, ideal driving style for the same route. The comparative depiction is preferably a graphical depiction of the route travelled comprising actual efficiency values and reference efficiency values which are incorporated into the route. Only one depiction is therefore preferably calculated and output, comprising both the route travelled (and possibly the future planned route to be travelled, differentiated graphically from the route travelled) and the efficiency evaluation for the route depicted. In this case, the efficiency evaluation calculated is incorporated immediately and directly into the graphical depiction of the route (for example as an overlay graphic). Alternatively or in addition thereto, it is also possible to depict merely the contrast or difference between the actual efficiency values and the reference efficiency values on the route travelled.

The monitor M serves to graphically output or display the efficiency evaluation calculated.

In a first embodiment of the invention, the scoring device S is formed in such a way that the actual calculation and the efficiency evaluation algorithm are carried out in the processor P. In this case, the vehicle model 14 provided in the back office BO is read into the scoring device S so as to be calculated therein.

In a second, alternative embodiment of the invention, the scoring device S takes the form of a distributed system and comprises parts which are carried out in the back office BO and comprises other parts or portions carried out directly in the scoring device S. For example, it is possible for the computing power itself to be delegated to a more powerful computer and for it to be carried out in the back office BO. In this case, the position and acceleration data obtained by the sensors are relayed via a wireless interface to the back office BO for further calculation. In this embodiment, the processor P is represented by a server portion in the back office computer and serves to carry out the efficiency calculation. The efficiency values established and the comparative depiction calculated are then transmitted as output data via the interface back to an electronic means located in the motor vehicle 10. The means may be a mobile telecommunications means H and/or a telematics unit T. Furthermore, it is in this case also possible to input a particular means address to which the values resulting from the efficiency calculation are to be transmitted in order to be depicted on the associated monitor M. For example, in this case the address of a navigation means having the appropriate user surface may be input, with the result that the efficiency evaluation calculated is displayed on the surface of the navigation means in the motor vehicle 10.

In the embodiment shown in FIG. 2, the acceleration sensors 12 are formed in the telematics unit T which is carried in the vehicle as an additional, separate electronic module and is connected, so as to exchange data, to the back office BO via an appropriate interface. In this embodiment, the telematics unit T serves to calculate the efficiency in a self-sufficient manner (in this case, "self-sufficient" is to be understood to mean "independent" and thus not dependent on calculations in or a connection to the back office BO). This embodiment is, however, not vital and it is also possible for the scoring device S to be integrated into a mobile telecommunications means H or a navigation means. In this case, it is possible for the vehicle model and/or the efficiency evaluation to be calculated at least in part on the server in the back office BO.

FIG. 2 is a schematic view of the telematics unit T which is formed with additional components or modules. As an alternative to the form of a telematics unit T, the means in question may also take the form of a mobile telecommunications means H which is formed with an appropriate scoring device S. The telematics unit T comprises a monitor M and the scoring device S which is connected, so as to exchange data, to the acceleration sensor 12 or the plurality of acceleration sensors 12 via the interface SS. Furthermore, the processor P is provided to calculate the efficiency evaluation of the route portion travelled or to be travelled based on the acceleration and position data read in. In the embodiment shown in FIG. 2, the scoring device S takes the form of a microprocessor module or circuit board which may be integrated into the mobile telecommunications means H and/or the telematics unit T. In this manner, the telematics unit T may advantageously be operated completely self-sufficiently (and independently of or without a connection to the back office BO). As an alternative to microprocessor implementation, the scoring device S may also take the form of a software application which may for example be loaded from the back office BO via a download procedure. In this case, it is also possible for the telematics unit T to be operated in such a way as to interact with the back office BO.

In an alternative embodiment, the system is formed so as to be more extensive and also comprises, in addition to the scoring device S with the processor P, the mobile telecommunications means H or the telematics unit T and an appropriate bus system or interfaces. The monitor M is also a component of the system and may form part of the telematics unit T, or the monitor M may be activated as a separate module via an interface. The system may also be connected to the back office BO.

Figure 3:
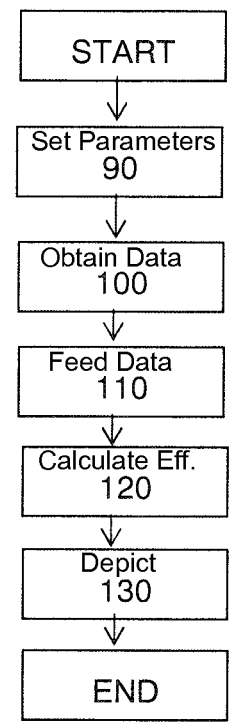
FIG. 3 is a flowchart of a method according to a further preferred embodiment.

A preferred process according to a preferred embodiment of the invention is described in more detail below with reference to FIG. 3.

After the system is started, the vehicle model (14) parameters are set in step 90. The parameter-setting process 90 is preferably carried out in a configuration phase preceding the calculation itself. In more complex embodiments, further configurations steps may be carried out at this point (for example obtaining additional sensor data, obtaining metadata, etc.).

Position and acceleration data are obtained in step 100. This is preferably achieved by acceleration sensors 12 provided which are preferably formed in the mobile telecommunications means H and/or the telematics unit T.

In step 110, the acceleration data obtained are fed into the vehicle model 14 provided for calculating a specific vehicle model.

In step 120, the efficiency evaluation for the route actually travelled (or the planned route to be travelled) is itself calculated. In this case, the efficiency values actually obtained are also compared with reference efficiency values.

Finally, in step 130, the efficiency evaluation is depicted in the form of a graphical depiction of the route travelled, incorporating the actual efficiency values. The actual efficiency values are measured values in respect of fuel consumption, component wear and potentially other data which provide an insight into the economy of the driving style. It is further possible to carry out a comparison with reference efficiency values which may also be incorporated into the graphical depiction of the route travelled.

In a development of the invention, the efficiency evaluation calculated is passed on to an open-loop control module. In this case, the open-loop control module serves to control vehicle components (speed, gearbox gear selection, etc.) in order to control or operate the vehicle in a semi-autonomous manner on the basis of the values calculated.

The method subsequently comes to an end or may be repeated.

In another development of the invention, the main calculation of the efficiency evaluation is carried out in a resource-optimised manner. For this reason, the calculation itself is outsourced to the back office BO, in which the vehicle model 14 is also saved and the specific vehicle model is calculated. The position data and acceleration data obtained are transferred to a digital map using map-matching methods. The route portion travelled is also transferred to or superimposed on the digital map. For this purpose, route identification methods, navigation-based methods or map-matching methods may be used. In an advantageous development of the invention, the scoring device S may be formed with at least one further OBD interface in order to optionally acquire on-board computer data and to supply it to the scoring device S for the further calculation of efficiency values.

The efficiency calculation may also take the form of an algorithm located on a web server as an independent application. The results of the efficiency calculation are visualised per journey or cumulatively for a plurality of journeys.

In an embodiment of the invention, the sensor data obtained are used to calculate actual efficiency values. Said actual efficiency values are then compared for similarity to reference efficiency values (which are intended to indicate an ideal driving style over the same route travelled). In an alternative embodiment of the invention, a first journey may act as a reference efficiency value for a further journey. This makes it possible to compare the driving style of the same driver at different time intervals for the same journey.

A significant advantage of the invention is that the efficiency evaluation calculated is stored in a storage unit. This is preferably carried out in the back office BO. In this manner, it is also possible to visualise efficiency evaluations at a later stage. It is thus possible for the driver to analyse his driving characteristics, for the purpose of improving them, afterwards (i.e. after travelling along the route) on any computer connected to the web server in the back office BO. In this case, the calculation of the score helps to differentiate poor journeys from good journeys in order to display progress with regard to the driving style. A comparison with reference efficiency values shows what further potential for improvement exists on the route in question.

The invention has been described above with reference to motor vehicles. The efficiency evaluation may, however, also be applied to other vehicles (such as lorries, commercial vehicles, etc.) within the scope of the invention. In a very narrow refinement of the scoring system, it is possible to provide only a back office BO and a mobile telecommunications means H comprising acceleration sensors 12. In alternative refinements of the invention, a telematics unit T, which is also carried in the vehicle and has acceleration sensors 12 and/or a monitor M, may be provided alone or in addition thereto. It is also possible for the telematics unit T to comprise the processor P.

While specific embodiments of the invention have been shown and described in detail to illustrate the inventive principles, it will be understood that the invention may be embodied otherwise without departing from such principles.

LIST OF REFERENCE NUMERALS

S Scoring device
10 Vehicle, in particular a motor vehicle
SS Interface
12 Position and acceleration sensor
H Mobile telecommunications means
T Telematics unit
P Processor
M Output unit, in particular a monitor
BO Back office
14 Vehicle model
90 Set vehicle model parameters
100 Obtain position and acceleration sensor data
110 Feed acceleration data obtained into model
120 Calculate efficiency values
130 Graphical depiction of efficiency calculation

We claim:

1. A scoring device for evaluating efficiency of a route travelled with a vehicle, comprising:
    an interface to at least one position or acceleration sensor for reading in acceleration data, wherein the position or acceleration sensor is formed in a mobile telecommunications means or telematics unit;
    a processor intended to read in the acceleration data and to feed the acceleration data read in into a vehicle model provided for calculating the efficiency evaluation of the route travelled and further intended to output the efficiency evaluation calculated, comprising a graphical comparative depiction of actual efficiency values and reference efficiency values on an output unit; and
    an interface to the output unit for outputting the efficiency evaluation calculated.

2. The scoring device according to claim 1, wherein the scoring device is integrated as an embedded system into the mobile telecommunications means or telematics unit or connectable to the mobile telecommunications means or telematics unit as a separate module without an interface to an on-board computer.

3. The scoring device according to claim 1, wherein the mobile telecommunications means or telematics unit comprise a position, acceleration or gyro sensor.

4. A telematics unit for evaluating efficiency of a journey with a vehicle over a route, comprising:
    a scoring device according to claim 1; and
    at least one mobile telecommunications interface.

5. A method for evaluating efficiency of a journey with a vehicle over a route, comprising the steps of:
    obtaining position or acceleration data via a mobile telecommunications means carried in the vehicle or via a telematics unit;
    feeding the position or acceleration data obtained into a vehicle model provided for calculating the efficiency evaluation of the route travelled; and
    outputting the efficiency evaluation calculated, comprising a graphical comparative depiction of actual efficiency values and reference efficiency values.

6. The method according to claim 5, wherein a specific vehicle model that is calculated in a processor or a central back office, or wherein the efficiency evaluation calculated is stored in a central back office, is depicted on an output means or is retrieved offline via an authorised interface.

7. The method according to claim 5, wherein parameters of the vehicle model are set by reading in or entering a vehicle type.

8. The method according to claim 5, wherein the calculated efficiency evaluation is carried out online while driving along the route and is updated iteratively and automatically for each new route portion travelled.

9. The method according to claim 5, wherein the calculated efficiency evaluation is carried out with a route identification algorithm or a map-matching-based method.

10. The method according to claim 5, wherein the calculated efficiency evaluation includes an evaluation of fuel consumption or vehicle wear.

11. The method according to claim 5, in which the calculated efficiency evaluation includes an indication of a change in the efficiency evaluation by location or time.

12. The method according to claim 5, wherein the calculated efficiency evaluation is accumulated over the route travelled.

13. The method according to claim 5, wherein no interfaces to the motor vehicle are used for the efficiency evaluation.

14. An efficiency evaluation system for a route travelled with a vehicle, comprising the following modules which are connected together so as to exchange data via interfaces:
    position or acceleration sensors which may be integrated into a mobile telecommunications means carried in the vehicle or via a telematics unit;
    a scoring device according to claim 1;
    a back office in which a vehicle model is provided; and an output unit intended for outputting the efficiency evaluation calculated, comprising a graphical comparative depiction of actual efficiency values and reference efficiency values.

* * * * *